US008093530B2

(12) United States Patent
Nishiwaki et al.

(10) Patent No.: US 8,093,530 B2
(45) Date of Patent: Jan. 10, 2012

(54) LASER CUTTING APPARATUS AND LASER CUTTING METHOD

(75) Inventors: Masayuki Nishiwaki, Yoshikawa (JP); Junichiro Iri, Yokohama (JP); Genji Inada, Kawasaki (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1518 days.

(21) Appl. No.: 11/280,874

(22) Filed: Nov. 15, 2005

(65) Prior Publication Data

US 2006/0108338 A1    May 25, 2006

(30) Foreign Application Priority Data

Nov. 19, 2004 (JP) ................................. 2004-335398

(51) Int. Cl.
    *B23K 26/00* (2006.01)
    *B23K 26/02* (2006.01)
(52) U.S. Cl. ............................. 219/121.61; 219/121.68
(58) Field of Classification Search ............... 219/121.6, 219/121.61, 121.67–121.69, 121.72, 121.76; 372/97, 108; 369/44.12; 250/227.12
    See application file for complete search history.

(56) References Cited

U.S. PATENT DOCUMENTS

| 4,200,846 | A | * | 4/1980 | Stark et al. ..................... 359/349 |
| 4,345,212 | A | * | 8/1982 | Seppala et al. ................. 359/349 |
| 4,908,813 | A | * | 3/1990 | Ojima et al. .................... 369/94 |
| 5,337,333 | A | * | 8/1994 | Daly et al. ....................... 372/94 |
| 5,756,924 | A | * | 5/1998 | Early ............................. 102/201 |
| H1926 | H | * | 12/2000 | Carruthers et al. ............... 372/6 |
| 6,437,284 | B1 | * | 8/2002 | Okamoto et al. ........ 219/121.73 |
| 7,149,029 | B1 | * | 12/2006 | Ionov ............................. 359/325 |
| 7,638,729 | B2 | * | 12/2009 | Park .......................... 219/121.67 |
| 2004/0002199 | A1 | | 1/2004 | Fukuyo |
| 2005/0173387 | A1 | | 8/2005 | Fukuyo |
| 2005/0181581 | A1 | | 8/2005 | Fukuyo |
| 2005/0184037 | A1 | | 8/2005 | Fukuyo |
| 2005/0189330 | A1 | | 9/2005 | Fukuyo |
| 2005/0194364 | A1 | | 9/2005 | Fukuyo |
| 2005/0205811 | A1 | * | 9/2005 | Partlo et al. ............... 250/504 R |

FOREIGN PATENT DOCUMENTS

| JP | 05029693 A | * | 2/1993 |
| JP | 405045303 A | * | 2/1993 |
| JP | 05-057464 A | | 3/1993 |
| JP | 2000356846 A | * | 12/2000 |
| JP | 2002-192370 A | | 7/2002 |
| JP | 2002-205180 A | | 7/2002 |
| JP | 2004-087663 A | | 3/2004 |
| JP | 02004140365 A | * | 5/2004 |
| JP | 2005-138143 A | | 6/2005 |
| WO | 03/008168 A1 | | 1/2003 |

* cited by examiner

*Primary Examiner* — Samuel M Heinrich
(74) *Attorney, Agent, or Firm* — Canon USA, Inc., I.P. Division

(57) ABSTRACT

A laser cutting apparatus and a laser cutting method are provided which are adapted to concentrate laser light into a silicon substrate to produce a plurality of internal cracks. A light concentrating position, to which laser beams included in the laser light are concentrated, is temporally and spatially displaced to appropriately change lengths of the cracks according to positions in a direction of depth of the substrate. Consequently, the lengths of the internal cracks are controlled to surely lead a crack opening, the starting point of which is the internal crack formed by laser processing, to a predetermined cutting line on a surface of the substrate.

3 Claims, 13 Drawing Sheets

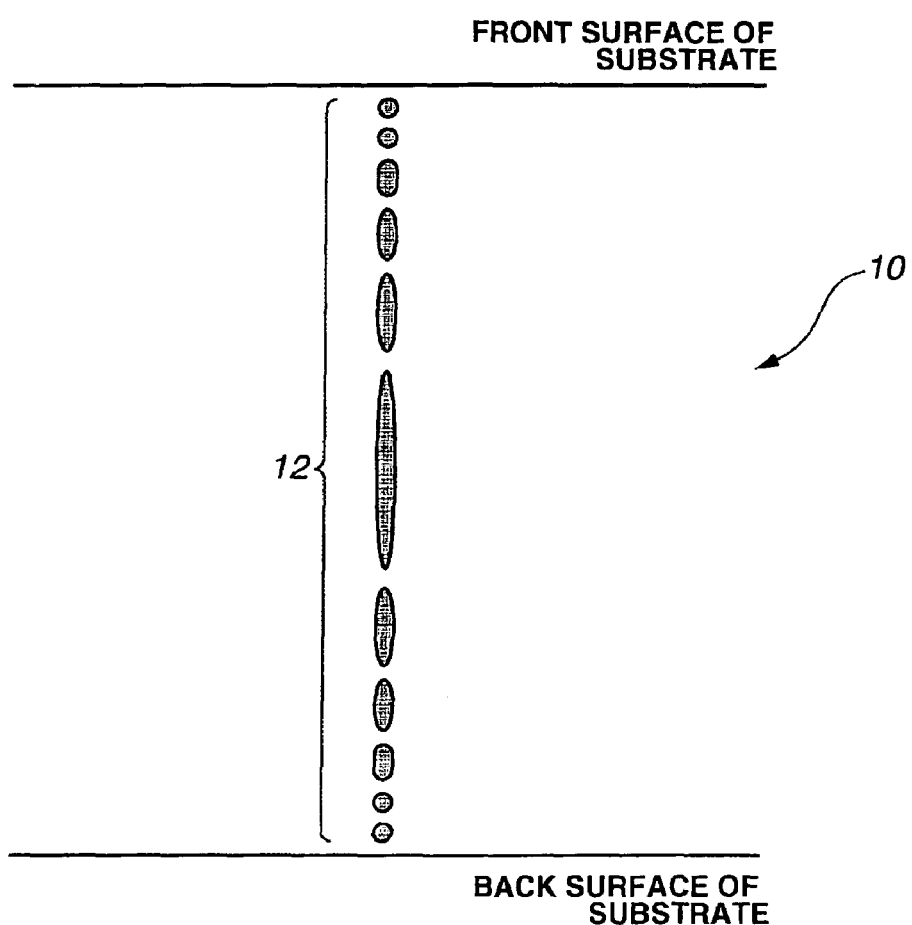

FIG.10A
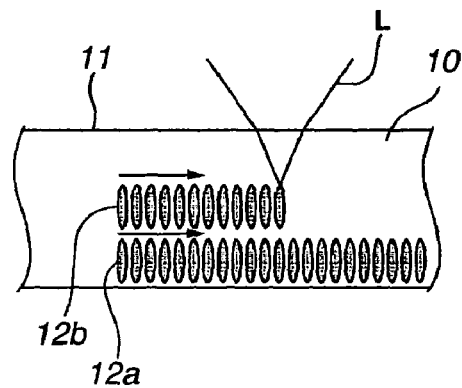
FIG.10C
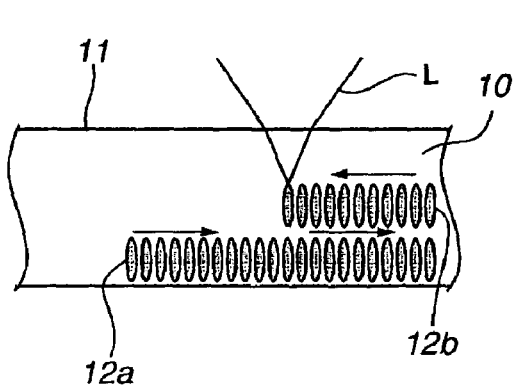
FIG.10B
FIG.10D
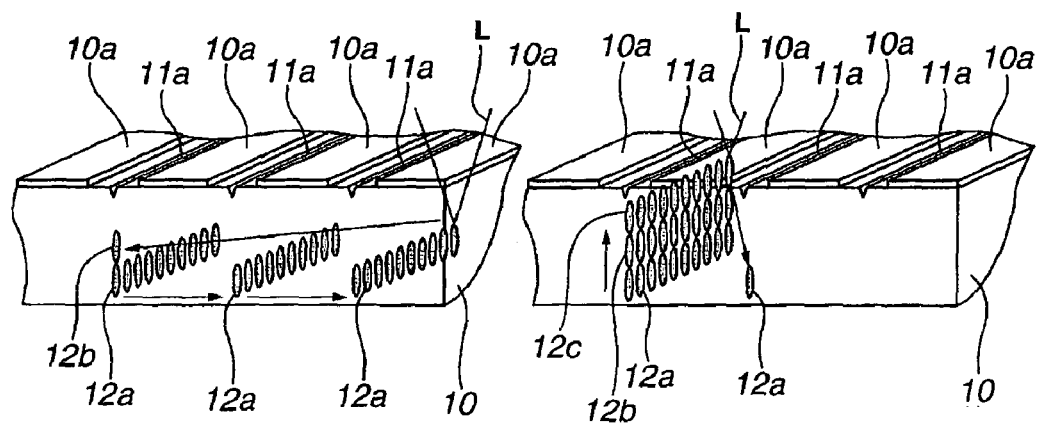

LASER CUTTING APPARATUS AND LASER CUTTING METHOD

BACKGROUND OF THE INVENTION

1. Field of the Invention

The present invention relates to a laser cutting apparatus and a laser cutting method which are adapted to cut a material by concentrating laser light into the material to separate the material into a plurality of regions.

2. Description of the Related Art

Hitherto, there are various techniques of separating a surface of a material, which is to be cut, into a plurality of areas by concentrating laser light into the material to thereby cut the material. An example of the techniques is a known blade dicing method adapted to rotate a circular blade, which has a width ranging from tens μm to hundreds μm, at a high speed in a case where a semiconductor substrate, such as a silicon wafer, is precisely cut into semiconductor chips, so that the substrate is abraded by abrasives provided on the surface of the blade to cut the substrate. According to this method, coolant water is sprayed onto a cutting surface so as to reduce heat generation and abrasion associated with the cutting of the substrate. At that time, dusts, such as chips produced by cutting the substrate itself, fine particles of abrasives, and particles of adhesive of an adhesive tape used to fix the substrate and a processing table, are mixed into coolant water and are widely scattered. Especially, in a case where the substrate is a semiconductor substrate, many minute function elements are formed on a surface of the substrate. Thus, there is a fear that the dusts seriously affect the reliability of the function elements.

Also the cutting of a substrate can be performed in a dry environment without using coolant water. Thus, a processing method of cutting the substrate by concentrating laser light having a wavelength, at which the laser light is highly absorbed by the substrate, onto a surface of the substrate is used. However, this method has drawbacks in that parts of the surface of the substrate, which surround a cut part, are thermally melted, that especially, in the case where the substrate is a semiconductor substrate, logic circuits provided on the substrate are damaged, and that similarly to the blade dicing, problems due to dusts occur, because laser processing proceeds while melting the substrate from a laser light incidence side to a laser light exit side, so that dusts produced by resolidification of melted materials adhere to the surface of the substrate.

Japanese Patent Application Laid-Open Nos. 2002-192370 and 2002-205180 disclose examples of the processing method of cutting a substrate by concentrating highly absorbable laser light into a substrate. These methods employ an internal processing region formed by concentrating laser light having a specific wavelength, at which the laser light has high permeability for the substrate, into the substrate as a starting point for cutting the substrate. Thus, no melted regions are formed on the surface of the substrate. Consequently, these methods enable dust-reduced cutting.

However, a starting point for cutting is limited by the aforementioned method to an internal processing region inside a material to be cut. Thus, it is difficult to precisely control the direction and the position of a crack that reaches the surface of the material from the starting point.

In a case where the length in the direction of depth of the internal processing region formed in the material to be cut is too long and, thus, a crack reaches the surface of the material, the crack appearing in the surface of the material causes a spurt of dust. Additionally, in a case where a functional device is formed on the surface of the material, the functional device is damaged.

Especially, in a case where the material to be cut is a silicon wafer, the development of the crack is easily affected by a crystal orientation. Therefore, in a case where there is a misalignment between a predetermined cutting line and the crystal orientation due to an industrial error caused when a silicon substrate and devices are formed, according to the aforementioned laser processing method, a crack deviating from the predetermined cutting line in the process of developing in the surface may break down logic circuits provided in device portions.

This problem is described below with reference to FIG. 15. In a case where a modified layer 102 is formed by concentrating laser light of a specific wavelength into a part of a predetermined depth in a silicon substrate 101 made of a single-crystal silicon having a front surface that is a (100) plane, a crack 103a, whose starting point is positioned at an end portion 102a of the modified layer 102 provided in the vicinity of the front surface, may reach the front surface. In this case, because a high-index crystal orientation plane is formed on the end portion 102a of the layer 102 modified by laser processing, the actual crack 103a is not an ideal crack 103 and is inclined in a direction along a cleavage plane of the single-crystal silicon, which is a (110) plane or a (111) plane. FIG. 15 schematically shows a case where the front surface is a (100) plane and where the cleavage surface is a (111) plane. Consequently, the front surface of the silicon substrate 101 is cut at a position largely deviating from a predetermined cutting line C. In a case where the modified layer 102 is formed deep in the substrate 101, sometimes, the distance between the end portion 102a and the front surface of the substrate 101 is too long, so that the cutting/separation of the substrate 101 cannot be achieved.

Especially, in a device substrate of a liquid discharge head in which a discharge port, such as an inkjet nozzle, is formed, an opening structure adapted to supply liquid, such as ink, is provided under the discharge port. Thus, a problem arises in that a crack extends to such a structure, so that the substrate is broken down. This problem often arises in a case where the thickness of the substrate is large relative to a modified layer formed inside the substrate.

SUMMARY OF THE INVENTION

At least one exemplary embodiment is directed to a laser cutting method and a laser cutting apparatus, which are adapted to concentrate laser light into a substrate to form an internal processing region so that the internal processing region (especially, internal cracks and processing traces, which serve as the internal processing regions) does not reach a surface of the substrate.

In one aspect of at least one exemplary embodiment, a laser cutting method, which is adapted to concentrate laser light to a light concentrating point at a predetermined depth inside a material from a surface of the material to form an internal processing region and adapted to cut the material to separate the surface of the material into a plurality of regions, includes a step of changing, when an irradiation pulse train is generated by concentrating a plurality of laser beams to the light concentrating point, a composite duration of the irradiation pulse train, and a step of forming the internal processing region by irradiating the material with the generated irradiation pulse train.

In another aspect of at least one exemplary embodiment, a laser cutting method and a laser cutting apparatus, which are adapted to concentrate laser light to a light concentrating point at a predetermined depth inside a material from a surface of the material to form an internal processing region and adapted to cut the material to separate the surface of the material into a plurality of regions, are configured to generate an irradiation pulse train by concentrating a plurality of laser beams to the light concentrating point, and to change a size of the internal processing region by changing a composite duration of the irradiation pulse train.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a perspective view of the silicon substrate. FIG. 1B is a partial perspective view of the silicon substrate shown in FIG. 1A. FIG. 1C is a partial cross-sectional view of the silicon substrate shown in FIG. 1B.

FIG. 7A is a schematic view illustrating a processing apparatus configured to irradiate laser light to a silicon substrate. FIG. 7B is a view illustrating a process of occurrence of an internal crack.

FIG. 9 is an explanatory view illustrating cracks in the direction of depth or thickness of the substrate in the internal crack formation step.

FIGS. 10A to 10D are explanatory views illustrating laser scanning methods employed to form a group of cracks at different depths.

DETAILED DESCRIPTION OF THE EMBODIMENTS

Exemplary embodiments of the invention will be described in detail below with reference to the drawings. However, the dimensions, materials, shapes and relative positions of the constituent parts shown in the embodiments should be changed as convenient depending on various conditions and on the structure of the apparatus adapted to the invention, and the invention is not limited to the embodiments described herein.

Figure 1A:
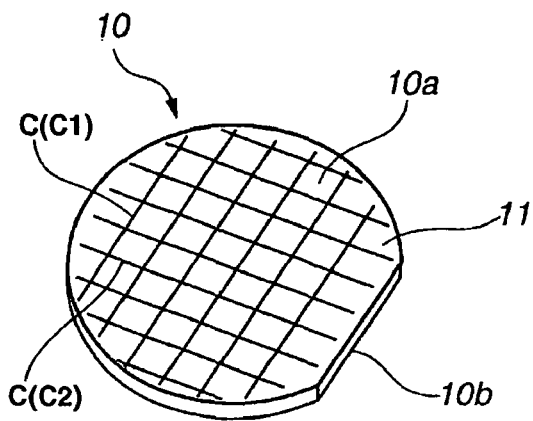
FIGS. 1A to 1C are schematic explanatory views illustrating a silicon substrate that is an example of the substrate processed according to an exemplary embodiment.

Description of the embodiments is started by explaining a cutting method of using a silicon substrate 10, on the surface of which a plurality of logic element portions 10a serving as semiconductor device portions are formed as shown in FIG. 1A, as an example of a material to be cut, and separating the silicon substrate 10 into the logic element portions 10a as device chips.

Figure 2:
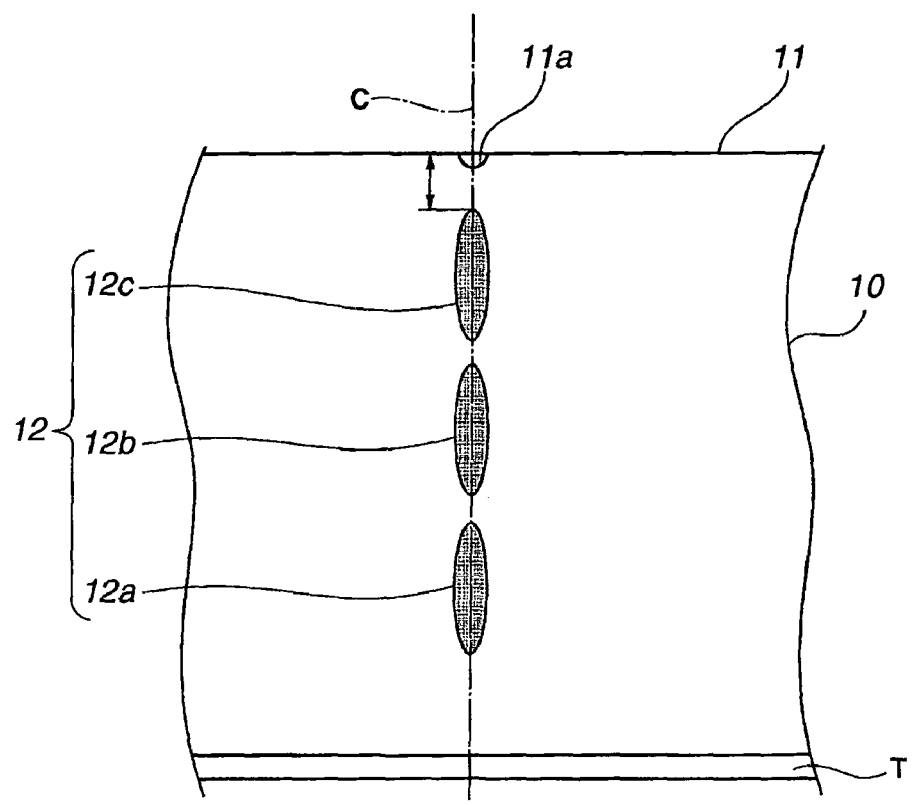
FIG. 2 is a schematic view illustrating at least one exemplary embodiment.

As shown in FIG. 2, laser light is concentrated to a light concentrating point at a predetermined depth inside the substrate from a surface 11 thereof to thereby form an internal processing region (for example, a melted region, a cracked region, or a region whose crystalline structure is changed), which does not reach the substrate surface 11. In the case of using the silicon substrate 10, a representative example of a visible internal processing region is a crack. A band-like crack group is formed along a predetermined cutting line C by forming internal cracks 12 (12a to 12c) inside the silicon substrate 10 and scanning (or performing relative displacement of) each light concentrating point along the predetermined cutting line C.

After or before the formation of such a crack group, concave portions are formed on the substrate surface 11 along the predetermined cutting lines C (C1 and C2). Practically, surface processing is performed to form surface-processing traces 11a that are linear portions processed by marking-off.

When an external force used to cut the substrate 10 is applied thereto after the formation of the surface-processing traces 11a and the internal processing of the crack group using laser light, stress is concentrated on the surface-processing traces 11a. Consequently, the surface-processing traces 11a are connected to the internal cracks 12c. Therefore, actual cutting lines produced on the substrate surface 11 does not deviate from the predetermined cutting lines C. A more detailed description is given below of this process.

Figure 1B:
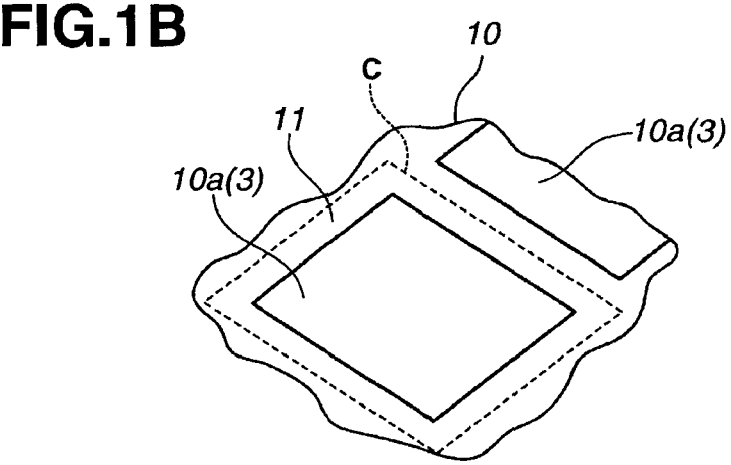
Figure 1C:
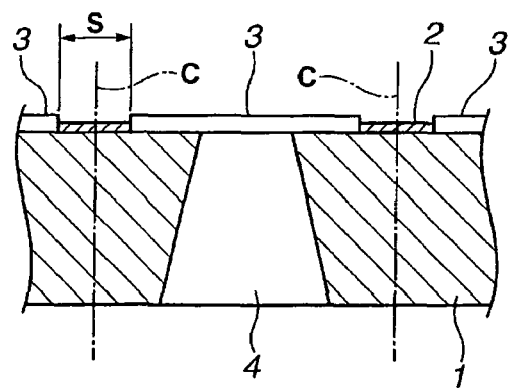

The 625 μm thick silicon substrate 10 shown in FIGS. 1A and 1B is configured so that as shown in FIG. 1C, an oxide film 2 having a thickness of about 1 μm is formed on a front surface of a silicon wafer 1, which is formed as a (100) plane. A nozzle layer 3, which is an epoxy resin structure and incorporates devices adapted to discharge a liquid such as ink, a logic element adapted to drive these devices, and wiring, is disposed on the oxide film 2 and constitutes each logic element portion 10a.

A liquid supply port (ink supply port) 4 serving as an opening portion is formed just under each of the nozzle layers 3, which incorporates the liquid discharge devices and so on, by anisotropic etching of the silicon wafer 1. The nozzle layers 3 are disposed across each of the predetermined cutting lines C so that the silicon wafer 1 can be cut into device chips in the final stage of a manufacturing process. The cutting lines C are formed along a crystal orientation of the silicon wafer 1. The interval S between the adjacent nozzle layers 3 is about 400 μm at minimum.

Figure 3:
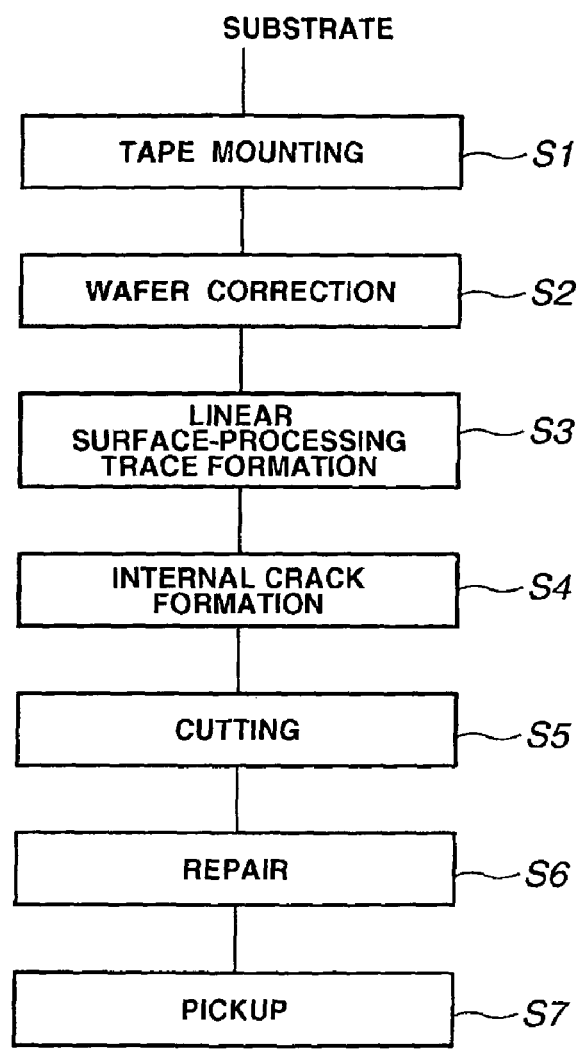
FIG. 3 is a flowchart illustrating a cutting process to be performed according to at least one exemplary embodiment.

FIG. 3 is a flowchart illustrating a cutting process for separating the silicon substrate 10 into the logic element portions 10a serving as individual device chips. The process illustrated in this flowchart includes seven steps, that is, a tape mounting step, a wafer correction step, a linear surface-processing trace formation step (a surface processing step), an internal crack formation step (an internal processing region formation step), a cutting step, a repair step, and a pickup step, which are sequentially performed.

These steps are described below in detail.

Tape Mounting Step

Figure 4:
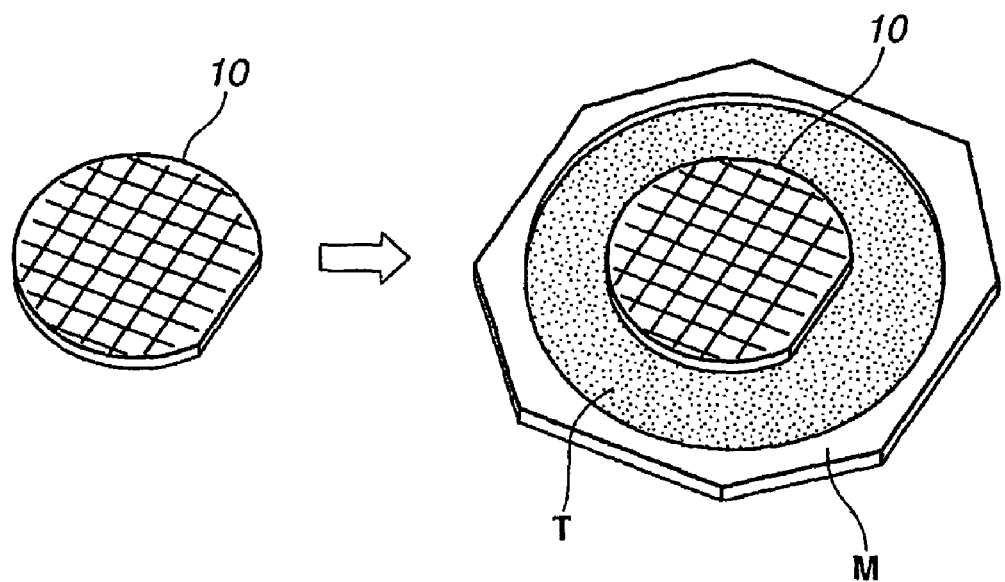
FIG. 4 is an explanatory view illustrating a tape mounting step.

First, as shown in FIG. 4, tape mounting is performed on the silicon substrate 10 to prevent the substrate 10 from being separated into devices prior to the cutting step. The tape mounting is performed by sticking a dicing tape T, to which a dicing frame M is stuck, to the back surface of the silicon substrate 10.

An adhesive tape, which is coated with an ultraviolet curing adhesive or with a pressure-sensitive adhesive, or an adhesive tape having a self-adhesive layer is used as the dicing tape T.

Wafer Correction (Warpage Correction) Step

Figure 5A:
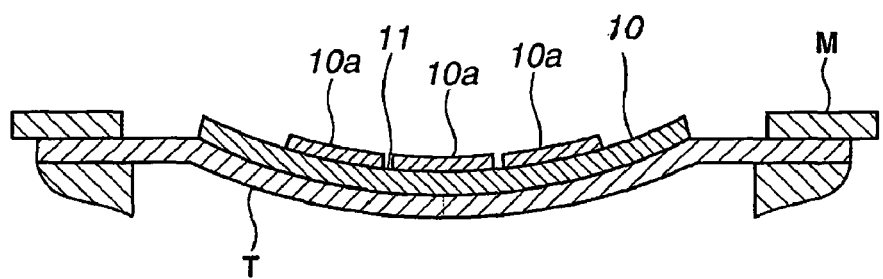
FIGS. 5A and 5B are explanatory views illustrating a wafer correction step.
Figure 5B:
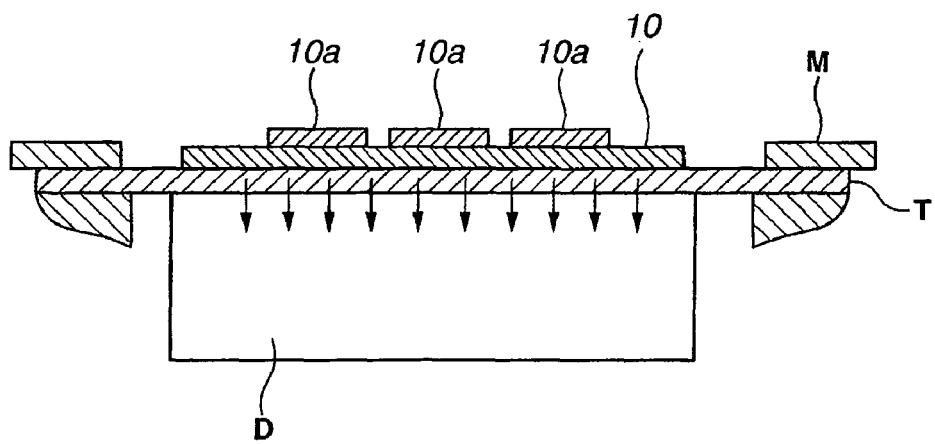

The nozzle layer 3, which is a resin layer formed on the surface of the silicon substrate 10 as described above, causes thermal contraction when hardened. Thus, the entire silicon substrate 10 is deformed as shown in FIG. 5A. When laser light is irradiated onto the silicon substrate 10, as will be described later, in this deformed state, angles of incidence of laser light locally vary on the substrate surface 11. Consequently, the silicon substrate 10 cannot be processed with good accuracy. Therefore, it is necessary to correct this deformation in advance. Thus, as shown in FIG. 5B, the silicon substrate 10 is sucked by a suction stage D from the side of the dicing tape T. Consequently, the silicon substrate 10 is planarized, so that the deformation of the silicon substrate 10 is corrected.

Linear Surface-Processing Trace Formation Step

Subsequently, to cut the silicon substrate 10 into logic element portions 10a with good accuracy, concave surface-processing traces 11a for causing crack propagation along the predetermined cutting lines C are formed in the substrate surface 11. The formation of the surface-processing traces 11a along the predetermined cutting lines C causes stress concentration on the surface-processing traces 11a in the cutting step to be performed later by using an external force. Consequently, crack openings are led to the surface-processing traces 11a. In addition, the surface-processing traces 11a serve as starting points, so that crack openings develop into the silicon substrate 10. Therefore, no unnecessary crack openings, which would break down the logic circuits, are produced.

Figure 6:
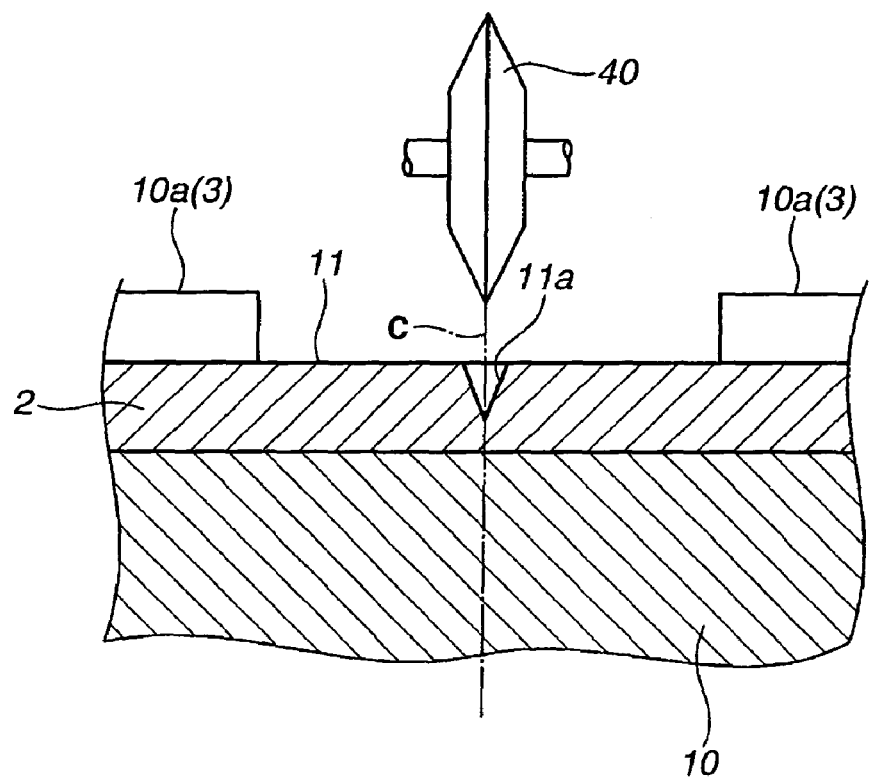
FIG. 6 is an explanatory view illustrating a linear surface-processing trace formation step in which a linear surface-processing trace is formed.

It is advisable to form the surface-processing traces 11a by using a scriber, such as a tool 40 provided with a superhard blade or a diamond blade, to mark off the surface of the oxide film 2 along the predetermined cutting lines C. In at least one exemplary embodiment, each of the surface-processing traces 11a is formed so that the width is equal to or more than 2 µm, and that the depth is equal to or more than 1 µm. However, it is necessary to set the size of each of the surface-processing traces 11a so that the trace 11a does not interrupt an optical path of laser light L which is used to form the internal cracks 12. A depth at which stress concentration is caused between the surface-processing traces 11a and the cracks is suitable as a processing depth. As illustrated in FIG. 6, this processing depth may be less than the thickness of the oxide film 2, which is a surface layer of the silicon substrate 10. Even in a case where the processing depth is equal to or more than the thickness of the oxide film 2, there is no problem.

It is indispensable to form the surface-processing traces 11a at least on the substrate surface 11 having the logic element portions 10a. However, the surface-processing traces 11a may be formed on both of the front surface and the back surface of the silicon substrate 10.

In a case where the surface-processing trace 11a is formed by marking-off processing using a tool, in the present embodiment, the formation of the surface-processing trace 11a is performed prior to the internal crack formation step, which will be described in detail later. Thus, unnecessary crack openings can be prevented from being produced due to a processing load. In addition, in a case where the surface-processing traces 11a are formed prior to the internal crack formation step, the surface-processing traces 11a themselves can be used as reference lines, which indicate processing positions at irradiation of laser light in the later step. Consequently, the working efficiency of the irradiation of laser light can be enhanced.

The surface-processing trace 11a may be formed after the internal crack formation step (the internal processing region formation step) is performed using laser light L. In this case, when an internal crack is formed, there is no influence of shading of laser light (a phenomenon that an amount of laser light reaching the inside of the substrate is reduced by reflection of laser light irradiated onto the concave inclined surface on which the surface-processing traces 11a are formed). Thus, the internal crack can be formed more efficiently.

Internal Crack Formation Step

Figure 7A:
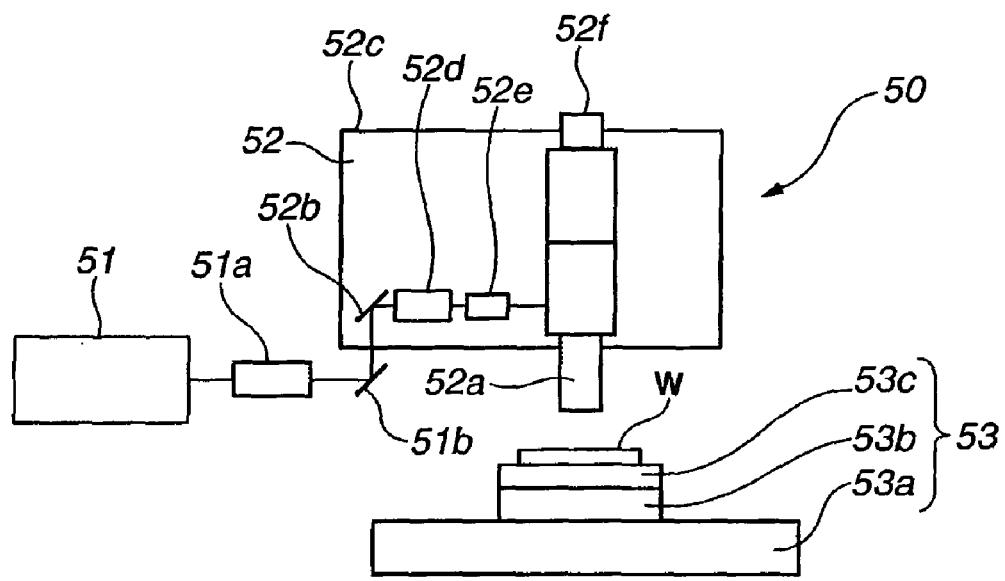
FIGS. 7A and 7B illustrate an internal crack formation step.

The internal cracks 12 shown in FIG. 2 are formed by using a processing apparatus 50 shown in FIG. 7A. The processing apparatus 50 includes a light-source optical system, a laser light concentrating optical system 52, and an automatic stage mechanism 53. The light-source optical system has a light source 51, a beam expanding subsystem 51a, and a mirror 51b. The laser light concentrating optical system 52 has a microscope objective lens 52a, a mirror 52b, and an automatic focusing device 52c. The automatic stage mechanism 53 has an X-stage 53a, a Y-stage 53b, and a micromotion adjustment stage 53c. The processing apparatus 50 also has an alignment optical system (not shown) adapted to perform alignment by using an orientation flat 10b (see FIG. 1A) of the silicon substrate 10 serving as a workpiece W.

Fundamental waves having a wavelength of 1064 nm, which are outputted from a pulse YAG laser, are used as laser light provided from the light source 51. The pulse width of the fundamental waves ranges from about 15 ns to about 1000 ns. The frequency thereof ranges from 10 kHz to 100 kHz. An excitation source of this laser is a semiconductor laser. Power of the laser can be changed by changing electric current injected into the semiconductor laser. The pulse width of the laser can be changed by changing an amount and a frequency of the injected electric current.

Laser light to be selected is determined according to the spectral transmission factor of the silicon substrate. Thus, any laser light of a wavelength region which can cause an intense electric field at the light concentrating point and has permeability for the silicon substrate may be used.

Laser light L outputted from the light source 51 is incident upon the light concentrating optical system 52 through a beam expanding subsystem 51a. For example, a lens having a magnification of 20 and an NA (numerical aperture) of 0.42 or a lens having a magnification of 50 and an NA of 0.55 is used as the microscope objective lens 52a of the light concentrating optical system 52. A condenser lens, which is applicable to the observation of the substrate surface using a microscope and is most suitable for the internal processing of the silicon substrate in consideration of the refractive index of silicon, can also be used as the microscope objective lens 52a of the light concentrating optical system 52. Laser light L concentrated onto the workpiece W by the light concentrating optical system 52 is incident upon the substrate surface 11 of the silicon substrate 10 serving as the workpiece W, which has the logic element portions 10a, on the automatic stage mechanism 53.

Figure 7B:
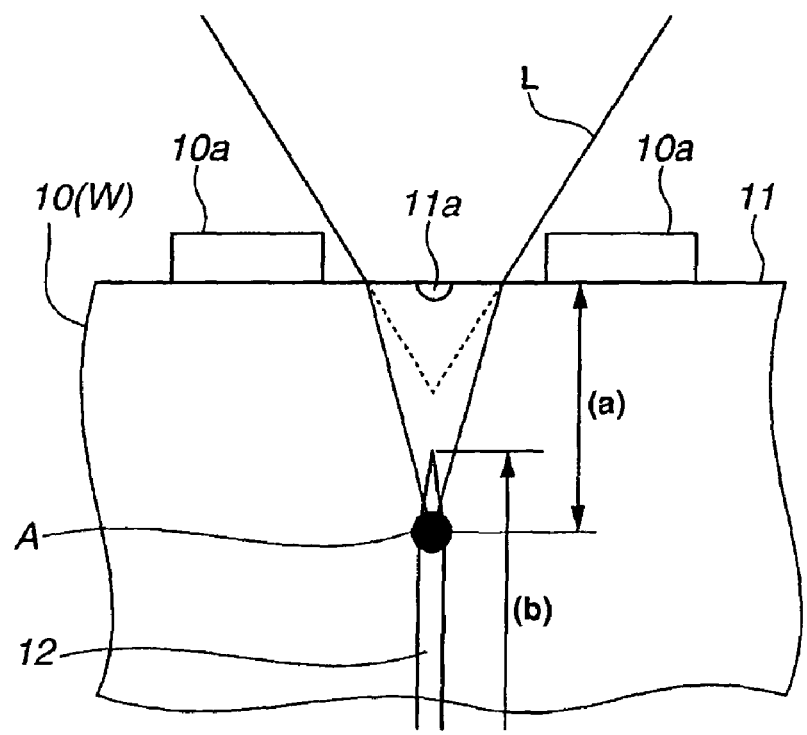

Optical conditions for processing the inside of the substrate are set to permit the presence of the surface-processing traces 11a on the substrate surface 11. Thus, the power of the optical system is increased in consideration of energy loss of the processing laser light L. Alternatively, light beams impinging upon the substrate to avoid the surface-processing traces 11a are selected. Consequently, light beams incident upon the substrate surface 11 are refracted in the silicon substrate 10 and are concentrated to the light concentrating point A (see FIG. 7B) at the predetermined depth (a) inside the silicon substrate 10 to thereby produce the internal cracks 12. The internal cracks 12 extend in a direction in which the cracks 12 move closer to the substrate surface 11 from the light concentrating points of laser light, or in a direction in which the cracks 12 move away from the substrate surface 11, and are formed in an internal processing region in which modification of the materials of light concentrating parts is performed (the modification includes melting, changing a crystalline structure, and cracking).

According to results of experiments, it is desirable to set processing conditions according to the light concentrating position, the film composition of the oxide film 2, the wavelength of laser light used, and the like so that the top of the uppermost internal crack 12c shown in FIG. 2 is located away 10 μm or more from the substrate surface 11. The conditions are set to prevent a connection between the internal crack 12c and the substrate surface 11 from being improperly generated during processing, and to prevent the substrate surface 11 from being damaged in some laser irradiating condition.

The depth (a) of the light concentrating point A can be controlled by moving one of the workpiece W, which is the silicon substrate 10, and the laser light concentrating optical system 52 in the direction of the optical axis to thereby displace the light concentrating position. Let "n" denote a refractive index of the silicon substrate 10 for laser light having a wavelength of 1064 nm. Let "d" designate an amount of mechanical displacement (an amount of displacement of one of the silicon substrate 10 and the laser light concentrating optical system 52 when moved in the direction of the optical axis). Then, an amount of optical displacement of the light concentrating point A is given by "nd". The refractive index n of the silicon substrate 10 is about 3.5 for laser light having a wavelength ranging 1.1 μm to 1.5 μm. The value of the refractive index n, which was actually measured in the experiment, was close to 3.5. That is, in a case where the amount of mechanical displacement is 100 μm, the laser light concentrating point is formed at a depth of 350 μm from the substrate surface.

The refractive index close to 3.5 indicates that the reflectance of the silicon substrate is high. Generally, the reflectance of the substrate in the case of vertical incidence of laser light is given by $((n-1)/(n+1))^2$, so that the reflectance of the silicon substrate is about 30%. The remaining energy reaches the inside of the silicon substrate. However, in consideration of light absorption by the silicon substrate itself, the final energy at the light concentrating point is reduced still more. According to a result of an actual measurement of the permeability of the silicon substrate having a thickness of 625 μm, the permeability of the silicon substrate was about 20%.

When the laser light L is concentrated to the light concentrating point A, the state of silicon crystal is partly modified. Consequently, the internal cracks 12 are formed. According to the result of the experiment, the length (b) of the internal crack 12 shown in FIG. 7B ranges from about 2 μm to about 100 μm. The size of the internal processing region in the substrate, which is formed by laser light, for instance, the crack length (b), can be changed by changing an oscillation pulse width of laser light. In a case where a semiconductor laser pumped Nd:YAG laser is used, the crack length (b) can be changed by changing the electric current injected into the semiconductor laser and an oscillation frequency thereof. Results of experiments reveal that a crack whose length is changed within a range from 2 μm to 100 μm can be formed when the pulse energy of the laser is changed within a range from 2 μJ to 100 μJ and the pulse width is changed within a range from 15 nsec to 1000 nsec.

The crack length is considered to be determined by the balance between compressive stress, which is generated by the temperature rise of a part in the vicinity of a laser-light concentrating point, and tensile stress, which is generated by the volume expansion of this part due to the amorphousization thereof. Thus, it is desirable for increasing the crack length to reduce the compressive stress and to increase the volume expansion. This can be achieved by increasing the pulse width at constant energy. However, even in a case where laser light having a long pulse width is simply irradiated, the peak value of a peak pulse is small when the pulse width is long. In this case, an electric field strength which is equal to or higher than a threshold value needed for phase transition to an amorphous phase is not obtained. Therefore, the phase transition to the amorphous phase does not occur at the laser-light concentrating point, so that no cracks are formed. For example, in the range of the pulse width from 17 nsec to 1100 nsec, the threshold value ranges from 2 μJ to 5 μJ. On the other hand, when the peak value of the peak pulse which is necessary for forming a crack is ensured, the pulse width becomes short. Consequently, a crack having a desired length cannot be obtained.

Thus, in a case where the pulse width (the pulse length) of a substantially single pulse (a pseudo pulse) can be selected while the peak value of the peak pulse which is necessary for forming a crack is obtained, a crack having a length corresponding to the pulse length can be formed. A pseudo pulse method according to the present embodiment is to successively irradiate pulses, the peak value of a peak pulse among which is ensured as described above, so that the irradiated pulses partially overlap. Consequently, short pulses are overlapped, so that a substantially single pulse (a pseudo pulse), whose pulse width is longer than the pulse width of a short pulse, can be obtained. The pulse length of this pseudo pulse is controlled by adjusting the number of short pulses thereby to obtain a crack having a desired length.

Figure 8A:
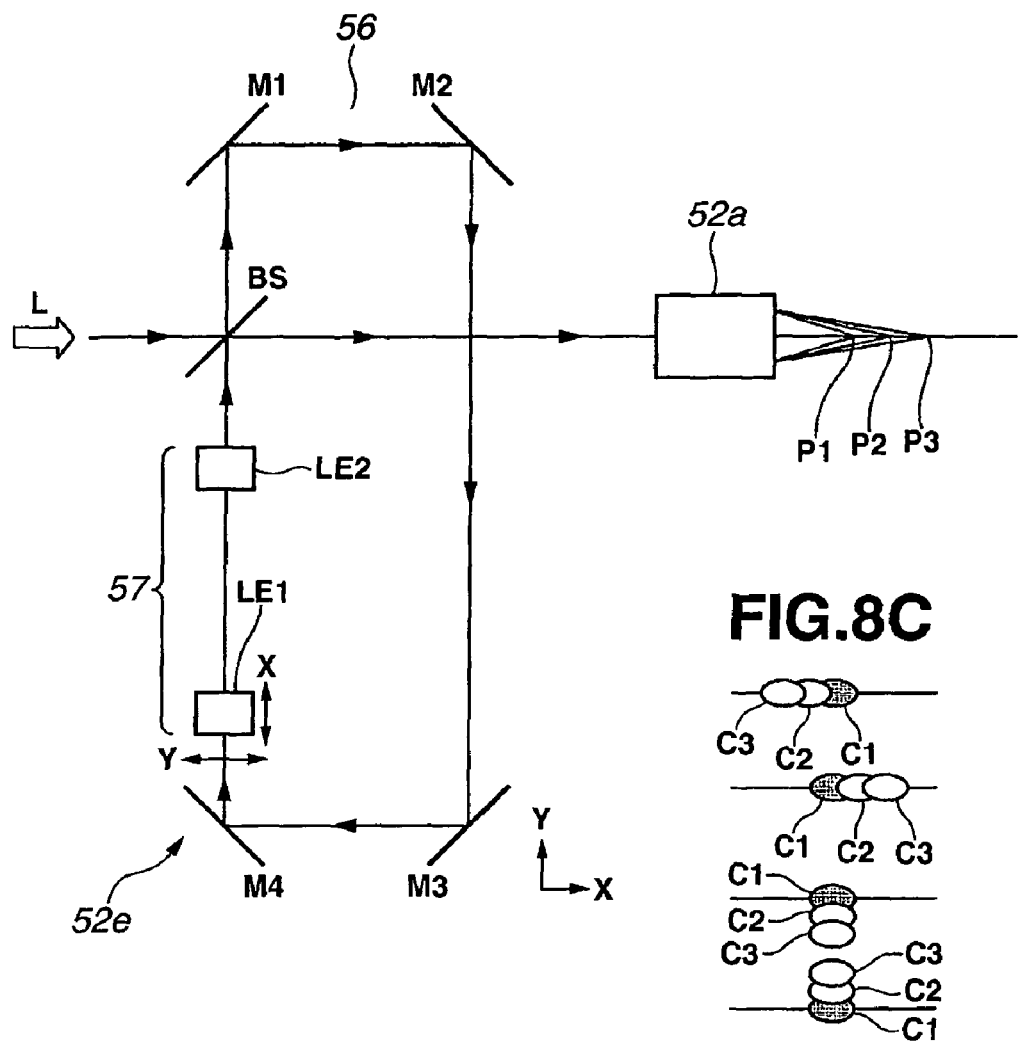
FIGS. 8A to 8D are explanatory views illustrating amplitude-splitting of a same pulse and concentration of split beams in the internal crack formation step.

FIG. 8A shows an optical subsystem 56 capable of generating pulses which differ in pulse width from one another and changing the light concentrating position, by using one laser beam that is incident on the light concentrating optical system 52 (see FIG. 7A). The optical subsystem 56 can form a pseudo composite pulse by amplitude-splitting a laser beam, which corresponds to a same pulse, to form a plurality of pulses.

A beam outputted from the beam expanding subsystem 51a is made to be incident on a beam splitting subsystem 52e. In the beam splitting subsystem 52e, laser light L is amplitude-split by a beam splitter BS into two beams. The beam splitter BS may be a polarizing beam splitter. A beam passing through the beam splitter BS is directly concentrated by the objective lens 52a of the light concentrating optical system 52.

A beam reflected by the beam splitter BS travels through a loop optical subsystem 56 which includes mirrors M1 to M4, and returns to the splitter BS. Lenses LE1 and LE2 are disposed in an optical path of the loop optical subsystem 56. The lenses LE1 and LE2 constitute an afocal optical system 57. When parallel beams are incident on the lens LE1, parallel beams are outputted from the lens LE2. The relation between the objective lens 52a and the lenses LE1 and LE2 is defined such that the light concentrating point of the lens LE1 corresponds to the position of an object plane of an optical system constituted by the objective lens 52a and the lens LE2. Thus, a beam outputted from the lens LE2 does not depend upon a spatial position of the light concentrating point of the lens LE1 and is disposed such that the aperture efficiency is 100%. In a case where the beam splitter BS is a polarizing beam splitter, it is necessary to place a wave plate in the optical path of the loop optical subsystem 56 to convert the beam into circularly polarized light.

The beam having returned to the beam splitter BS is amplitude-split, similarly to the previous case. Reflected light travels through the optical path directed to the objective lens 52a this time, while transmitted light travels through the optical path in the loop optical subsystem 56 again and returns to the beam splitter BS once more again. The number of times by which the beam circulates through the loop optical subsystem 56 is determined according to the energy loss caused when the beam passes through the optical system.

Figure 8C:
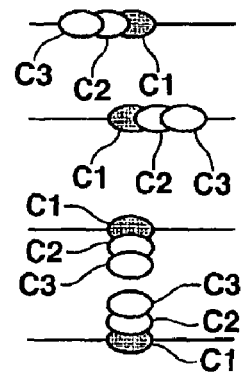
Figure 8B:
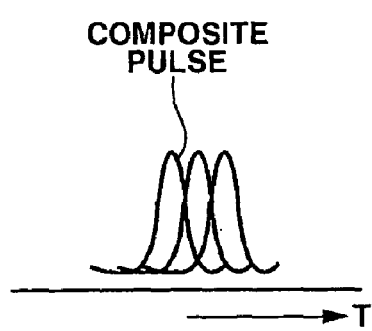

Consequently, the light concentrating position, to which the laser beam is concentrated by the objective lens 52a, spatially coincides with, for example, a position P1. However, the laser beam reaches the light concentrating position P1 while being delayed according to the number of times by which the laser beam passes through the loop optical subsystem 56. FIG. 8B schematically shows light pulses of the laser beam delayed in terms of time. A pulse train including a plurality of pulses, which reach the light concentrating position P1 while being temporally displaced from one original pulse laser beam L, is regarded as a pseudo composite pulse having a pulse width corresponding to a total delay time. Because the velocity of light is $3 \times 10^8$ m/sec, a delay time of about 3 nsec is generated when the length of the optical path is increased by 1 m. Thus, a pseudo pulse having a desired pulse width can be obtained by forming an optical path having an appropriate length.

In addition, when the lens LE1 of the afocal optical subsystem 57 is slightly moved in the X-direction, which is the direction of an optical axis, or in the Y-direction intersecting with the direction of the optical axis, the state of the afocal optical subsystem 57 in the optical path is changed. The light concentrating position of beams outputted from the objective lens 52a is changed to a position P2 or P3, which is spatially displaced from the position P1, due to the change of the state of the afocal optical subsystem 57. The amount of the spatial displacement increases according to the number of times by which the beam passes through the afocal optical subsystem 57. FIG. 8C shows cracks C1 to C3, each of which corresponds to the number of times by which the associated laser beam passes through the afocal optical subsystem 57. Reference character C1 designates the crack corresponding to a case where the associated laser beam does not pass through the afocal optical subsystem 57. Reference characters C2 and C3 designate the cracks formed by concentrating laser beams which are arranged in an ascending order of the number of times by which the laser beam passes through the afocal optical subsystem 57.

The cracks C1 to C3 formed at the time of moving the lens LE1 in the X-direction are shown on the upper two lines of FIG. 8C. The cracks C1 to C3 formed at the time of moving the lens LE1 in the Y-direction are shown on the lower two lines of FIG. 8C.

Figure 8D:
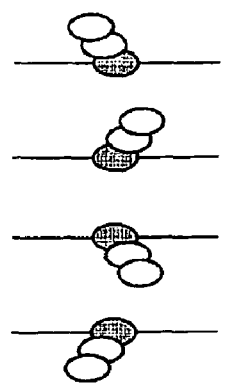

FIG. 8D shows the cracks C1 to C3 formed in a case where the lens LE1 is moved simultaneously in both of the X-direction and the Y-direction. Let X1, X2, Y1, and Y2 denote the displacements of the lens LE1, which correspond to the four lines from the top line to the bottom line in FIG. 8C, respectively. A composite displacement generated from the displacements X1 and Y2, that generated from the displacements X2 and Y2, that generated from the displacements X2 and Y1, and that generated from the displacements X1 and Y1 are respectively shown on lines from the top line to the bottom line in FIG. 8D.

These sequences of light concentrating points are obtained by checking the lengths of the formed cracks at experiments and designing the loop optical subsystem 56 to spatially and temporally displace pulses so that cracks having sizes and positions which are most appropriate for cutting the substrate are formed. The state of the crack is changed in one silicon substrate according to a cutting place, such as an end portion of the substrate. Thus, more adequate cutting is achieved so that the crack does not deviate from the predetermined cutting line on the substrate surface and that dust is not produced.

In order to increase the pulse width, a plurality of laser light sources may be used to generate laser beams that correspond to a pseudo pulse having a long pulse width. Alternatively, a plurality of pulses may be generated by dividing a laser beam into a plurality of beams through the use of an optical device. Alternatively, an optical system capable of temporally and spatially displacing the light concentrating point may be used.

Subsequently, a relative movement of the position, to which laser light used to form an internal processing region is irradiated on the substrate surface, along the substrate surface is performed. Thus, the internal processing region is formed in a direction along the substrate surface. Practically, each of internal cracks is formed by starting the formation thereof with one point in the silicon substrate 10. Then, the relative movement of the light concentrating point A along the predetermined cutting line C is performed to perform internal processing of a part of the substrate just under the predetermined cutting line C. As shown in FIG. 1A, the predetermined cutting lines C on the silicon substrate 10 include predetermined cutting lines C1 and C2, which are orthogonal to each other with respect to the orientation flat 10b.

The workpiece W, which is the silicon substrate 10, is placed on the automatic stage mechanism 53 capable of moving in the X-direction and the Y-direction. A Z-stage (automatic focusing device) 52c capable of moving in the direction of the optical axis (the direction of depth) is provided at the side of the automatic stage mechanism, on which the workpiece W is put, or at the side of the light concentrating optical system. Thus, the distance between the light concentrating optical system 52 and the workpiece W is variable.

The movement speed in the X-direction and the Y-direction is determined in consideration of the laser oscillation frequency and the shape of a crack. Usually, in a case where the frequency ranges from 10 kHz to 100 kHz, the target value of the movement speed ranges from 10 mm/sec to 100 mm/sec. When the movement speed is equal to or higher than 100 mm/sec, the following adverse effects of the movement speed are produced. That is, the internal processing is performed sporadically in the direction of the movement. The distance between the adjacent cracks on the same predetermined cutting line becomes extremely large.

The light concentrating optical system 52 has an observation camera 52f. The position of the camera 52f is conjugate with the position of an irradiation point on the workpiece W. Meanwhile, the reflectance of the silicon substrate 10 is about 30%. Thus, if the reflectance of the silicon substrate 10 is ignored, the devices of the observation camera 52f are damaged. Thus, a filter corresponding to an output of the laser is disposed. An observation illumination system employs a relay lens such that a light source can be formed at the position of the entrance pupil of the microscope objective lens 52a used to concentrate light to form a Kohler illumination system. Illumination is performed through the filter. Thus, the illumination optical device is prevented as much as possible from being damaged.

In addition to the observation optical system, an AF (automatic focusing) optical system (not shown) is introduced to the processing apparatus 50 to measure the distance from the workpiece W thereto. The AF optical system obtains the value of contrast of an image obtained by the observation camera 52f. Then, the AF camera 52f measures a focus and a gradient from the obtained value of the contrast. Actually, this measurement is performed while the distance from the workpiece W is slightly changed. An optimal position is thus determined. It is determined according to parallelism of the workpiece W, which is the silicon substrate 10, whether to perform an AF operation. Information on this AF operation is used as data when the set laser oscillation conditions are changed.

The length of a crack formed at one light concentrating point ranges from about 2 μm to about 100 μm. The thickness of the silicon substrate to be processed is 625 μm. Thus, it is necessary for cutting the silicon substrate to perform the internal processing a plurality of times. At one line concentrating point, the internal processing is started from a far side from the front surface of the substrate (an inner side of the substrate) to a closer side to the front surface. At that time, as shown in FIG. 9, the oscillation conditions of the laser are set by using processing position information. The vicinity of the surface is processed by setting the lengths of cracks and increasing the density thereof. Consequently, when the substrate is cut, cracks formed in the vicinity of the surface are easily coupled to each other. Thus, more accurate cutting can be performed. Also, a single crack is formed so that the length of the internal crack (the size of the internal processing region) other than the crack formed in the vicinity of the substrate surface is long (large) in the direction of thickness (depth).

When the internal processing is performed to form internal cracks, the processing is performed so that an internal crack formed in the vicinity of the substrate surface does not reach the substrate surface having a surface-processing trace. Processing conditions enabling internal cracks, which have already been formed close to the light concentrating point, to grow under the influence of heat generated by irradiation of laser light and to reach the substrate surface are not selected. Therefore, when a crack is formed in the vicinity of the substrate surface, the pulse width is set to be long. Simultaneously, the pulse energy is set to be reduced to a value close to a threshold value for forming a crack. IN at least one exemplary embodiment, the optical system used to process the vicinity of the substrate surface has a large NA. At a depth from the substrate surface, which is smaller than 50 μm, the value of the NA can also be set to be equal to or higher than 0.55.

However, this is not applicable to the processing in the inside of the substrate. The internal crack may be parted into the cracks 12a to 12c in the direction of depth (the direction of thickness or a direction intersecting with the surface of the substrate), as shown in FIG. 2 or 9. Alternatively, the internal cracks 12a to 12c may be coupled together.

The internal crack 12c closest to the substrate surface 11 is provided at a depth ranging from 10 μm to 100 μm from the substrate surface 11 of the silicon substrate and in such a position that the crack 12c does not communicate with the surface-processing trace 11a.

Next, an order of processing groups of cracks is described below.

According to a first method, as illustrated in FIGS. 10A, 10B, and 10C, upon completion of forming a group of cracks at a certain depth from the surface, for example, a group of the internal cracks 12a at substantially the same depth corresponding to a plurality of or all of the predetermined cutting lines C, the formation of a group of the internal cracks 12b at a different depth is performed. The formation of the groups of the cracks at each depth is performed inside the silicon substrate 10 in stages. Thus, the influence of the adjacent predetermined cutting lines C can be reduced.

According to a second method, as illustrated in FIG. 10D, upon completion of forming the groups of the internal cracks 12a, 12b, 12c at different depths inside the substrate just under one of the predetermined cutting lines C, the formation of a group of similar cracks corresponding to another predetermined cutting line C is performed. According to this method, the number of times of performing the AF operations on the substrate surface at a processing starting point can be reduced in a case where the correction of the focal position for planarity of the silicon substrate 10 is needed.

There are two modes of performing the first method. In a first mode, the light concentrating point is moved along the predetermined cutting line C only in one orientation, as illustrated in FIG. 10A. In a second mode, the light concentrating point is reciprocated along the predetermined cutting line C, as illustrated in FIG. 10C. In the second mode, a total of moving distance of the light concentrating point is reduced. Thus, the processing time can be decreased.

The present embodiment employs the second mode. The mode to be selected is determined by comprehensively taking into consideration the conditions of an object (for example, the parallelism of the silicon substrate or the undulation of the surface thereof).

Cutting Step

In the silicon substrate 10 in which the surface-processing traces 11a and the plurality of internal cracks 12a, 12b, and 12c are formed corresponding to each of the predetermined cutting lines C, at least the internal crack 12c formed just under the surface-processing trace 11a is not connected to the surface-processing trace 11a. Thus, the logic element portions 10a of the laser processed silicon substrate 10 are not yet cut off. A procedure for cutting the silicon substrate 10 held in this state into device chips is performed as follows.

Figure 11A:
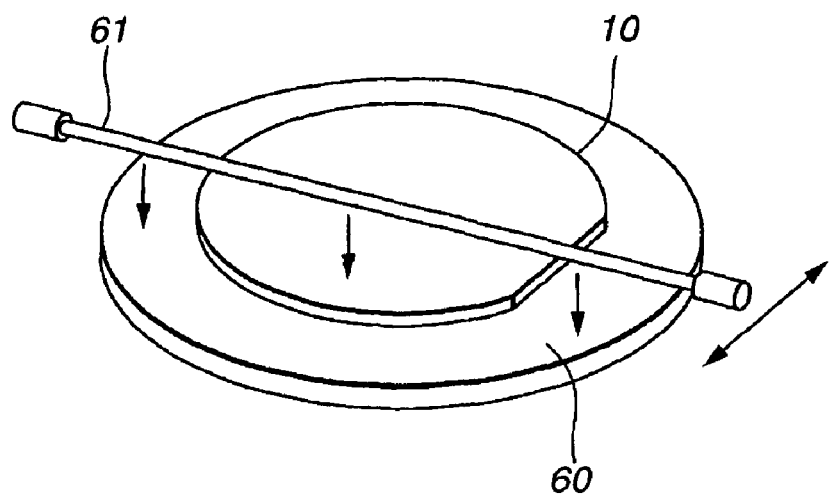
FIGS. 11A and 11B are explanatory views illustrating a cutting step performed by using a roller.

As shown in FIG. 11A, after the surface-processing traces 11a and the internal cracks 12 (12a, 12b, and 12c) are formed, the silicon substrate 10 mounted on the dicing tape T is put on a rubber sheet 60 in a cutting apparatus such that the back surface of the silicon substrate 10 is turned up. This rubber sheet 60 is made of an elastic material, such as silicon rubber or fluorocarbon rubber. To prevent stain from adhering to the surface 11 of the silicon substrate 10 due to the contact between the surface 11 and the rubber sheet 60, commercially available masking tape R, which is used for back-grinding, may be stuck to the front surface side of the silicon substrate 10 after the formation of the internal cracks.

Cutting is performed by pressing the silicon substrate 10 with a stainless steel roller 61 through the dicing tape T. First, the silicon substrate 10 is put on the rubber sheet 60 such that one of the predetermined cutting lines C formed on the silicon substrate 10, for example, in a first cutting direction, is substantially parallel to a shaft of the roller 61. When the silicon substrate 10 is pressed by rolling the roller 61, the rubber sheet 61 is deformed to be depressed. Stress in an extending direction acts on the side of the rubber sheet 60, that is, the front surface side of the substrate 10. This stress acts on the substrate surface 11 to broaden the weakest places of the substrate surface 11, that is, the surface-processing traces 11a on the predetermined cutting lines C1.

Figure 11B:
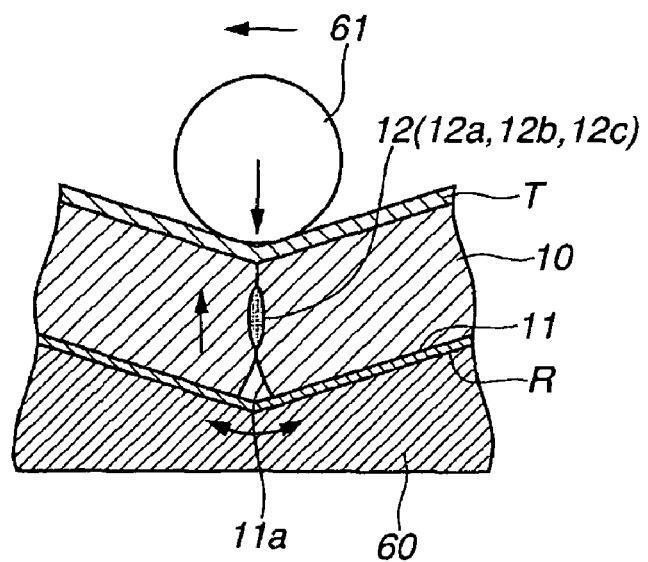

Consequently, as shown in FIG. 11B, a crack is produced from the surface-processing trace 11a serving as a starting point. This crack develops to the back surface of the substrate 10 by connecting the internal cracks 12a, 12b, and 12c formed by irradiating laser light into the substrate 10. Thus, the crack reaches the back surface of the substrate 10. Consequently, the silicon substrate 10 is cut along the predetermined cutting line C1. The development of the crack occurs along the crystal orientation of the silicon substrate 10. However, the cutting of the substrate 10 is caused by the connection of the cracks with the surface-processing trace 11a. Therefore, an actual cut line does not largely deviate from the predetermined cutting line C1 formed on the substrate surface 11. As the roller 61 proceeds, the cutting of parts of the silicon substrate 10 is sequentially finished along the predetermined cutting line C1 that extends in the first cutting direction. The roller 61 may be advanced by using any one of a method of rolling the roller 61 from an end portion of the silicon substrate 10 to the other end portion thereof, and a method of causing the roller 61 to start pressing the vicinity of the center of the surface of the silicon substrate 10 and to proceed to an end portion of the surface of the silicon substrate 10.

Subsequently, the silicon substrate 10 is turned 90°, so that the predetermined cutting line C2 extending in the second cutting direction is substantially parallel to the shaft of the roller 61. Similarly to the cutting along the first cutting direction, the silicon substrate 10 is pressed by the roller 61 to generate a crack from the surface-processing trace 11a, which is a starting point, in the second cutting direction. Then, the crack develops to and reaches the back surface of the substrate 10.

According to the aforementioned process, the silicon substrate 10 is cut into individual device chips.

The cutting step illustrated in FIGS. 11A and 11B is performed by causing stress, which is caused by deformation of the rubber sheet due to the hard roller, to act on the surface of the silicon substrate. However, the logic elements and the nozzle layer should be prevented from being broken down. Thus, it is necessary to appropriately select the values of a pressure load on the silicon substrate from the roller, and the thickness of the rubber sheet, and the hardness of the rubber. Also, it is necessary to appropriately select the material and the thickness of the dicing tape and the surface masking tape.

A method of cutting the silicon substrate having the surface-processing traces and the internal cracks by using an external force acting thereon along the predetermined cutting lines may be one of the following two methods.

Figure 12:
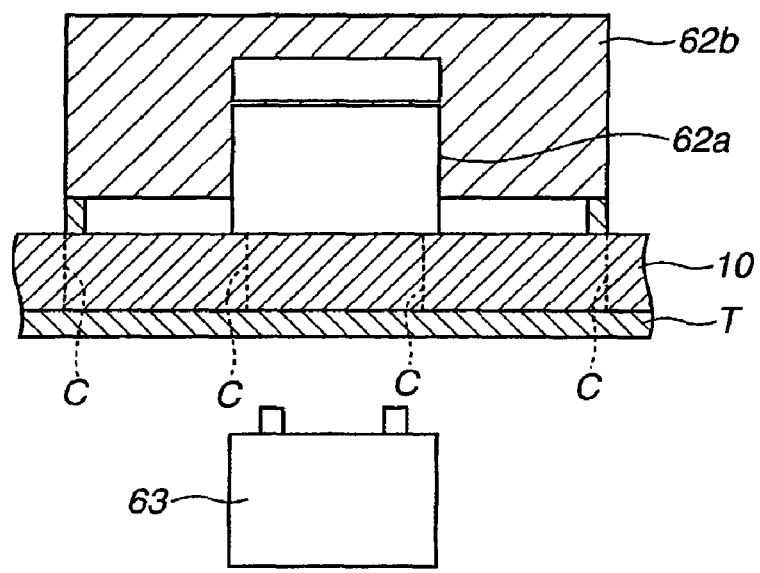
FIG. 12 is an explanatory view illustrating the cutting step performed by using a collet.

A first method is, as shown in FIG. 12, to cut off devices along the predetermined cutting line C by applying bending-stress to the predetermined cutting line C between the logic element portions 10a of the silicon substrate 10. In a state in which the front surface side of the logic element portion 10a to be cut is supported by a collet (A) 62a and the back surface side thereof is supported by a pin 63, the pin 63 is moved upward by a distance ranging from about 1 μm to about 10 μm. At that time, adjacent logic element portions 10a are held by a collet (B) 62b to prevent the adjacent logic element portions 10a from being moved upward. Consequently, stress adapted to broaden the surface-processing trace 11a on the predetermined cutting line C acts on the silicon substrate 10, so that a crack is generated extending from the surface-processing trance 11a serving as a starting point. Then, the crack is connected to the internal crack 12 and reaches the back surface of the silicon substrate 10.

Figure 13:
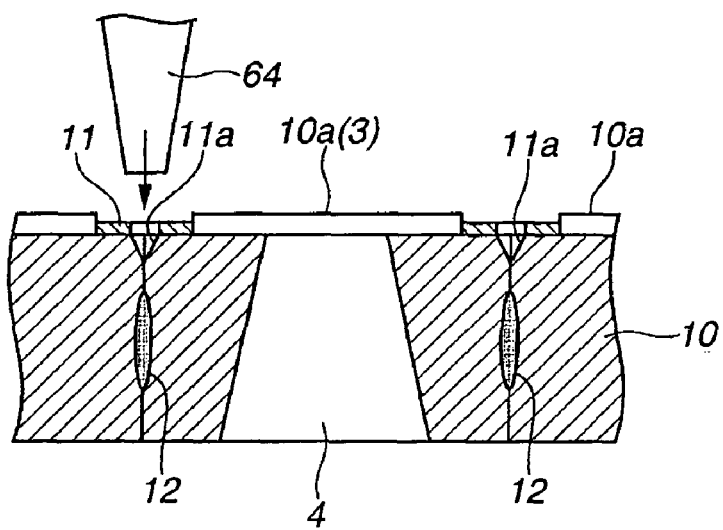
FIG. 13 is an explanatory view illustrating a case where the substrate is cut by using a tool to hit the substrate.

A second method is, as shown in FIG. 13, to give mechanical impact directly to the front surface side of the silicon substrate 10 along the predetermined cutting line C. After the formation of the surface-processing traces 11a and the internal cracks 12, the silicon substrate 10 is conveyed to a single point bonder. The substrate surface 11, for example, in the vicinity of the surface-processing trace 11a, is continuously hit by a hard micro-tool 64 to form a crack opening extending from a starting point that is the surface-processing trace 11a.

Also, it is considered to cut the substrate by applying thermal shock onto the laser-processed substrate.

Repair Step

In the cutting step, the surface-processing traces 11a are connected to crack openings due to the internal cracks 12 by newly generated cracks. Also, the crack openings reach the back surface side of the silicon substrate 10. The silicon substrate 10 is then separated into device chips.

However, in an accidental case where complete separation of the substrate is not achieved, it is necessary to re-cut the substrate. A method of re-cutting the substrate is to use a mechanism illustrated in FIGS. 14A and 14B to apply stress only to the individual logic element portions 10a that are not completely cut off. Thus, such logic element portions 10a are completely cut off.

Pickup Step

Figure 14A:
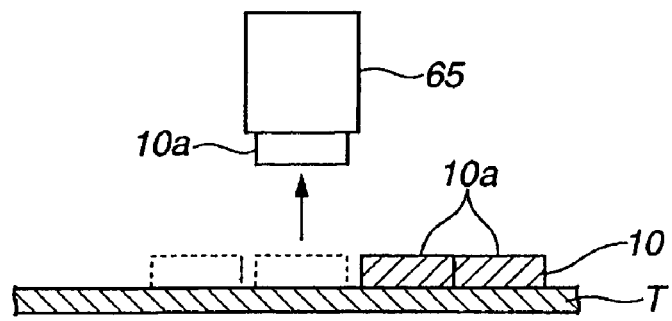
FIGS. 14A and 14B are explanatory views illustrating a repair step.
Figure 14B:
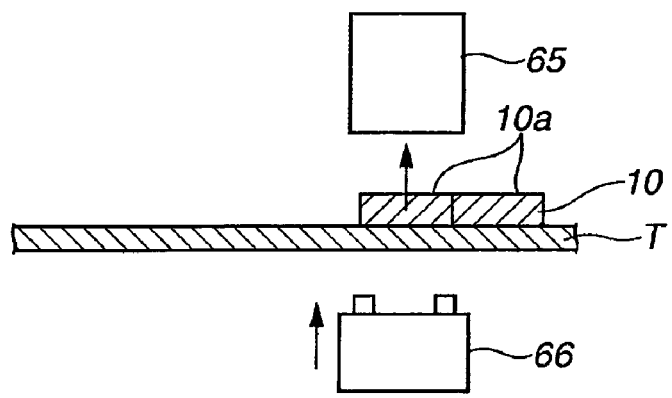
Figure 15:
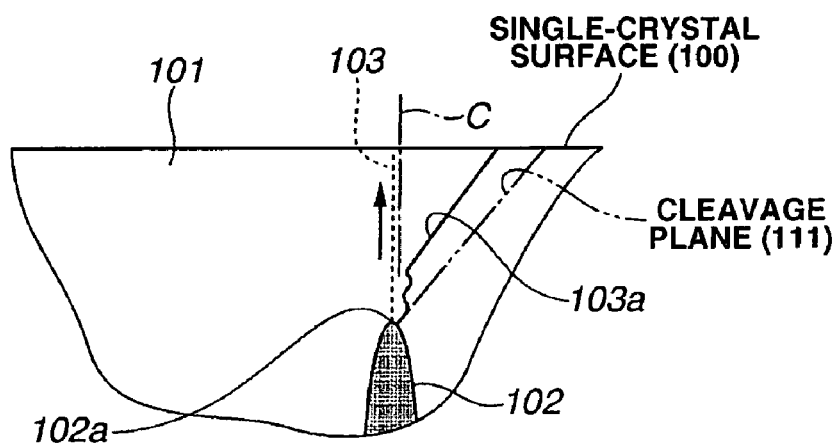
FIG. 15 is an explanatory view illustrating a related art method of cutting a substrate.

The logic element portions 10a separated in the cutting step and the repair step, which are device chips, are conveyed by using a suction collet 65 and a pickup pin 66 as shown in FIGS. 14A and 14B. The conveyed device chips are individually accommodated. At that time, the device chip is picked up by broadening the gap between the device chips. This facilitates an operation of picking up the device chips. Also, fine dust produced at the pickup operation is removed by suction. This is effective in enhancing the reliability of the device chips 10a.

In the aforementioned embodiment, to form cracks that differ from one other in spatial length, a plurality of laser beams having wavelengths, at which the laser beams are permeable against the silicon substrate, and differing from one another in pulse width can be used. Alternatively, a laser system capable of providing the combination of at least one of laser pulse beams having wavelengths, at which the beams are permeable against the substrate, with a continuous-wave laser beam similarly having a wavelength, at which the laser beam is permeable against the substrate, can be used. To generate a plurality of beams by using one laser, for example, an amplitude-splitting device, a wavefront-splitting device, and a polarization splitting device may be used as the splitting device.

According to the aforementioned embodiment, when the internal processing region (for instance, a crack) is formed by concentrating laser light into a material to be cut, the size of the internal processing region can be changed according to the position in the direction of depth of the material from the surface thereof. Thus, formation of an internal processing region which would reach the surface of the material can be prevented. Consequently, the present embodiment eliminates a fear of contamination of the surface of the material, which surface would be contaminated by performing blade-dicing or using a conventional method of performing laser-processing on the surface of the material.

Also, according to the present embodiment, a small internal processing region can be formed in the vicinity of the surface of the material to be cut. When the material is cut, cracks can surely be connected to one another by forming a large number of such small internal processing regions. Thus, a crack can be prevented from developing while deviating from a predetermined cutting line.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2004-335398 filed Nov. 19, 2004, which is hereby incorporated by reference herein.

What is claimed is:

1. A laser processing apparatus configured to concentrate laser light to a light concentrating point at a predetermined depth in a material from a surface of the material to form an internal processing region, comprising:

a stage on which the material is disposed;
a laser light source; and
a loop optical system including a beam splitter;
an afocal optical system provided in an optical path of the loop optical system and having an optical element whose relative position to the optical path is variable;
wherein a laser beam emitted from the laser light source is split by the beam splitter; out of the split laser beams, one laser beam is radiated to the material and the other laser beam is guided to the loop optical system and then, further split by the beam splitter; and out of the further split laser beams, one laser beam is radiated to the material and the other laser beam is guided to the loop optical system again.

2. The laser processing apparatus according to claim 1, wherein the laser beams to be radiated to the material are emitted on the same axis.

3. The laser processing apparatus according to claim 1, wherein a light concentrating position of the laser light pulse that travels through the loop optical subsystem does not coincide with a light concentrating position of the laser light pulse that does not travel through the loop optical subsystem.

* * * * *